United States Patent
Srivastava et al.

(10) Patent No.: US 11,611,626 B1
(45) Date of Patent: Mar. 21, 2023

(54) METHODS, SYSTEMS, AND COMPUTER READABLE MEDIA FOR DISTRIBUTING NETWORK FUNCTION (NF) HIGH AVAILABILITY (HA) TOPOLOGY INFORMATION IN A CORE NETWORK

(71) Applicant: Oracle International Corporation, Redwood Shores, CA (US)

(72) Inventors: Ankit Srivastava, Uttar Pradesh (IN); Jay Rajput, Bangalore (IN); Virendra Singh, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/334,268

(22) Filed: May 28, 2021

(51) Int. Cl.
*H04L 67/51* (2022.01)
*H04L 67/1095* (2022.01)
*H04L 67/5682* (2022.01)

(52) U.S. Cl.
CPC .......... *H04L 67/51* (2022.05); *H04L 67/1095* (2013.01); *H04L 67/5682* (2022.05)

(58) Field of Classification Search
CPC .. H04L 67/16; H04L 67/1095; H04L 67/2852
USPC ........................................................ 709/220
See application file for complete search history.

(56) References Cited

U.S. PATENT DOCUMENTS 11,265,694 B2 * 3/2022 Farooq .................. H04W 8/005
2017/0303259 A1 * 10/2017 Lee ....................... H04W 28/16

2020/0396132 A1   12/2020  Wang et al.
2021/0111985 A1    4/2021  Mahalank et al.

FOREIGN PATENT DOCUMENTS

WO    WO-2020202043 A1 * 10/2020

OTHER PUBLICATIONS

VMWare, Configure Security VNF with HA, Sep. 21, 2020, docs.vmware.com, https://docs.vmware.com/en/VMware-SD-WAN/4.2/VMware-SD-WAN-Administration-Guide/GUID-E14FAFBA-D825-4DEA-A827-2AF693B6E305.html (Year: 2020).*
3GPP, ETSI TS 123 501 V16.6.0, Oct. 2020, etsi.org, https://www.etsi.org/deliver/etsi_ts/123500_123599/123501/16.06.00_60/ts_123501v160600p.pdf (Year: 2020).*

(Continued)

*Primary Examiner* — Zi Ye

(57) ABSTRACT

A method for distributing network function (NF) high availability (HA) topology information in a core network includes, at an NF repository function (NRF) including at least one processor, receiving, from a plurality of producer NFs in an NF set, NFRegister requests including NF HA topology information for the producer NFs. The method further includes registering the producer NFs and storing the NF HA topology information for the producer NFs. The method further includes receiving, from a consumer NF or service communication proxy (SCP), an NFDiscover request containing at least one service discovery parameter that corresponds to a service provided by the producer NFs. The method further includes responding to the NFDiscover request by generating an NFDiscover response, including, in the NFDiscover response, the NF HA topology information for the producer NFs, and transmitting the NFDiscover response to the consumer NF or SCP.

17 Claims, 11 Drawing Sheets

(56) References Cited

OTHER PUBLICATIONS

3GPP, ETSI TS 129 510 V16.4.0, Jul. 2020, etsi.org, https://www.etsi.org/deliver/etsi_ts/129500_129599/129510/16.04.00_60/ts_129510v160400p.pdf (Year: 2020).*

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; System architecture for the 5G System (5GS); Stage 2 (Release 17)" 3GPP TS 23.501 V17.0.0 (Mar. 2021).

Commonly-Assigned, co-pending U.S. Appl. No. 17/578,300 for "Methods, Systems, and Computer Readable Media for Prioritizing Among Alternate Network Function (NF) Instances", filed Jan. 18, 2022.

Commonly-Assigned, co-pending U.S. Appl. No. 17/488,793 for "Methods, Systems, and Computer Readable Media for Identifying Alternate Delivery Endpoints for Mobile Originated Data and Monitoring Reports in a Communications Network", filed Sep. 29, 2021.

"3rd Generation Partnership Project; Technical Specification Group Core Network and Terminals; Numbering, addressing and identification; (Release 17)," 3GPP TS 23.003, V17.3.0, pp. 1-145 (Sep. 2021).

"3rd Generation Partnership Project; Technical Specification Group Core Network and Terminals; 5G System; Principles and Guidelines for Services Definition; Stage 3 (Release 17)," 3GPP TS 29.501, V17.3.1 pp. 1-78 (Sep. 2021).

"3rd Generation Partnership Project; Technical Specification Group Core Network and Terminals; 5G System; Technical Realization of Service Based Architecture; Stage 3 (Release 17)," 3GPP 29.500, V17.4.0, pp. 1-109 (Sep. 2021).

"3rd Generation Partnership Project; Technical Specification Group Services and System Aspects; Procedures for the 5G System (5GS); Stage 2 (Release 17)," 3GPP TS 23.502, V17.2.1, pp. 1-712 (Sep. 2021).

"3rd Generation Partnership Project; Technical Specification Group Services and System Aspects; System architecture for the 5G System (5GS); Stage 2 (Release 17)," 3GPP TS 23.501, V17.2.0 pp. 1-542 (Sep. 2021).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Core Network and Terminals; 5G System; Network Exposure (NE) function services for Non-IP Data Delivery (NIDD); Stage 3 (Release 17)," 3GPP TS 29.541, V17.1.0, pp. 1-40 (Sep. 2021).

Commonly-Assigned, co-pending U.S. Appl. No. 17/386,649 for "Methods, Systems, and Computer Readable Media for Providing for Network Function (NF) Fallback to Recovered NF Repository Function (NRF)", filed Jul. 28, 2021 (Unpublished).

"3rd Generation Partnership Project; Technical Specification Group Core Network and Terminals; 5G System; Technical Realization of Service Based Architecture; Stage 3 (Release 17)," 3GPP TS. 29.500, V17.2.0, pp. 1-100 (Mar. 2021).

"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).

Notification of Transmittal of the International Search Report and the Written Opinion of the International Searching Authority, or the Declaration for International Application No. PCT/US2022/030874 (dated Sep. 1, 2022).

"3rd Generation Partnership Project; Technical Specification Group Services and System Aspects; Study on enablers for network automation for the 5G System (5GS); Phase (Release 17), " 3GPP TR 23.700-91, V17.0.0, pp. 1-382 (Dec. 2020).

\* cited by examiner

METHODS, SYSTEMS, AND COMPUTER READABLE MEDIA FOR DISTRIBUTING NETWORK FUNCTION (NF) HIGH AVAILABILITY (HA) TOPOLOGY INFORMATION IN A CORE NETWORK

TECHNICAL FIELD

The subject matter described herein relates to providing high availability support for NFs. More particularly, the subject matter described herein relates to methods, systems, and computer readable media for distributing NF HA topology information in a core network.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the service communication proxy, and the service communication proxy load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is that 3GPP standards do not provide a way for NFs to publish their HA topology information to other NFs in the 5G network. NFs in the 5G network support different HA topologies, including active-active, active-standby, an N+K, where N is the number of active NF instances and K is the number of standby NF instances. Consumer NFs seeking to obtain service from a producer NF that operates in an HA topology need to know the HA topology for load balancing and for rerouting in the event that a producer NF providing service to a consumer NF fails. However, 3GPP standards do not currently provide a way for producer NFs to publish their HA topology information to the core network. As a result, load balancing and rerouting may be sub-optimally performed in the 5G core network.

In light of these and other difficulties, there exists a need for methods, systems, and computer readable media for distributing NF HA topology information in the core network.

SUMMARY

A method for distributing network function (NF) high availability (HA) topology information in a core network includes, at an NF repository function (NRF) including at least one processor, receiving, from a plurality of producer NFs in an NF set, NFRegister requests including NF HA topology information for the producer NFs. The method further includes registering the producer NFs and storing the NF HA topology information for the producer NFs. The method further includes receiving, from a consumer NF or service communication proxy (SCP), an NFDiscover request containing at least one service discovery parameter that corresponds to a service provided by the producer NFs. The method further includes responding to the NFDiscover request by generating an NFDiscover response, including, in the NFDiscover response, the NF HA topology information for the producer NFs, and transmitting the NFDiscover response to the consumer NF or SCP.

According to another aspect of the subject matter described herein, receiving the NFRegister requests including the NF HA topology information includes receiving the NFRegister requests including information identifying an NF HA topology type supported by the producer NFs.

According to another aspect of the subject matter described herein, the information identifying the NF HA topology type includes information identifying one of: an active-active NF HA topology type, an active-standby NF HA topology type, and an N+K NF HA topology type, where N and K are integers respectively identifying a number of active NFs and a number of standby NFs in the NF set.

According to another aspect of the subject matter described herein, receiving the NFRegister requests including the NF HA topology information includes receiving the NFRegister requests, each including information identifying a current NF HA topology role of a producer NF in the NF set.

According to another aspect of the subject matter described herein, the information identifying the current NF HA topology role of the producer NF in the NF set includes information identifying the producer NF as an active NF or a standby NF.

According to another aspect of the subject matter described herein, responding to the NFDiscover request with the NFDiscover response including the NF HA topology information comprises including, in the NFDiscover response, the information identifying the NF HA topology type and the information identifying the current NF HA topology role.

According to another aspect of the subject matter described herein, the method for distributing NF HA topology information includes, at the NRF, receiving, from at least one of the producer NFs, an NFUpdate request including updated NF HA topology information for the at least one producer NF and, in response to the receiving the NFUpdate request with the updated NF HA topology information for the at least one producer NF, storing the updated NF HA topology information for the at least one producer NF and automatically communicating the updated NF HA topology information to consumer NFs subscribed to receive updates in NF profile information for the at least one producer NF.

According to another aspect of the subject matter described herein, the updated NF HA topology information indicates a change in role of a first producer NF in the NF set from an active HA role to a standby HA role and of a second producer NF in the NF set from a standby HA role to an active HA role and wherein the method further comprises, at the consumer NF or SCP, transmitting a service request to the second producer NF.

According to another aspect of the subject matter described herein, receiving the NFDiscover request from a consumer NF or SCP includes receiving the NFDiscover request from a consumer NF, and further comprising, at the consumer NF, using the NF HA topology information to select a producer NF in the NF set to provide service to the consumer NF.

According to another aspect of the subject matter described herein, receiving the NFDiscover request from a consumer NF or SCP includes receiving the NFDiscover request from an SCP, and further comprising, at the SCP, using the NF HA topology information to select a producer NF in the NF set to provide service to the consumer NF.

According to another aspect of the subject matter described herein, a system for distributing network function (NF) high availability (HA) topology information in a core network is provided. The system includes a network function (NF) repository function (NRF) including at least one processor. The system further includes an NF profiles manager implemented by the at least one processor for receiving, from a plurality of producer NFs in an NF set, NFRegister requests including NF HA topology information for the producer NFs, registering the producer NFs and storing the NF HA topology information for the producer NFs, receiving, from a consumer NF or service communication proxy (SCP), an NFDiscover request containing at least one service discovery parameter that corresponds to a service provided by the producer NFs, and responding to the NFDiscover request by generating an NFDiscover response, including, in the NFDiscover response, the NF HA topology information for the producer NFs, and transmitting the NFDiscover response to the consumer NF or SCP.

According to another aspect of the subject matter described herein, the NFRegister requests include information identifying an NF HA topology type supported by the producer NFs.

According to another aspect of the subject matter described herein, the information identifying the NF HA topology type includes information identifying one of: an active-active NF HA topology type, an active-standby NF HA topology type, and an N+K NF HA topology type, where N and K are integers respectively identifying a number of active NFs and a number of standby NFs in the NF set.

According to another aspect of the subject matter described herein, the NFRegister requests each include information identifying a current NF HA topology role of a producer NF in the NF set.

According to another aspect of the subject matter described herein, the information identifying the current NF HA topology role of the producer NF in the NF set includes information identifying the producer NF as an active NF or a standby NF.

According to another aspect of the subject matter described herein, the NFDiscover response includes the information identifying the NF HA topology type and the information identifying the current NF HA topology role.

According to another aspect of the subject matter described herein, the NF profiles manager is configured to receive, from at least one of the producer NFs, an NFUpdate request including updated NF HA topology information for the at least one producer NF and, in response to the receiving the NFUpdate request with the updated NF HA topology information for the at least one producer NF, store the updated NF HA topology information for the at least one producer NF and automatically communicate the updated NF HA topology information to consumer NFs subscribed to receive updates in NF profile information for the at least one producer NF.

According to another aspect of the subject matter described herein, the updated NF HA topology information indicates a change in role of a first producer NF in the NF set from an active HA role to a standby HA role and of a second producer NF in the NF set from a standby HA role to an active HA role.

According to another aspect of the subject matter described herein, the NF profiles manager receives the NFDiscover request from a consumer NF.

According to another aspect of the subject matter described herein, the NF profiles manager receives the NFDiscover request from an SCP.

According to another aspect of the subject matter described herein, a non-transitory computer readable medium having stored thereon executable instructions that when executed by a processor of a computer control the computer to perform steps is provided. The steps are performed at a network function (NF) repository function (NRF). The steps include receiving, from a plurality of producer NFs in an NF set, NFRegister requests including NF high availability (HA) topology information for the producer NFs. The steps further include registering the producer NFs and storing the NF HA topology information for the producer NFs. The steps further include receiving, from a consumer NF or service communication proxy (SCP), an NFDiscover request containing at least one service discovery parameter that corresponds to a service provided by the producer NFs. The steps further include responding to the NFDiscover request by generating an NFDiscover response, including, in the NFDiscover response, the NF HA topology information for the producer NFs, and transmitting the NFDiscover response to the consumer NF or SCP.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
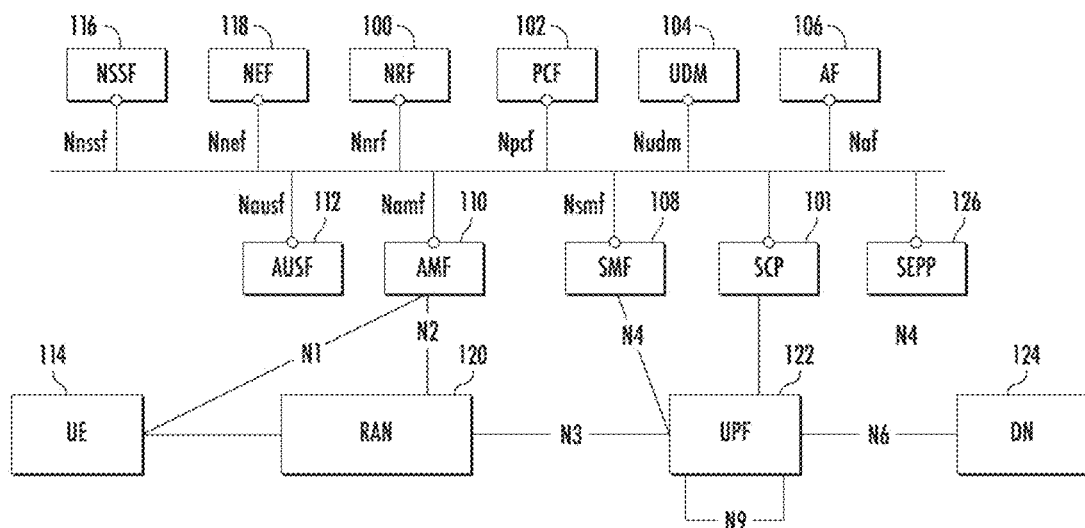
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem in 5G networks is the lack of a defined mechanism for an NF to distribute its HA topology information. For example, different NFs in the 5G core (5GC) network may implement different HA topology types. Examples of such HA topology types are:

Active-Active—where multiple NFs in an NF set are operational and provide service at the same time;

Active-Standby—were some NFs are operational and provide service and other NFs are operational but do not provide service unless one of the active NFs fails or otherwise becomes unavailable; and N+K model—where N NFs are operational and provide service and K NFs are operational but do not provide service unless one of the N active NFs fails or otherwise becomes unavailable.

It is important for the NF consumer/SCP to know the NF producer's HA topology for (re-)routing and load balancing of 5G SBI traffic. 3GPP does not provide a way to publish HA related information in the network. 3GPP implies active-active HA topology for an NF set, which is not true for all deployments. An NF set is a logical group of NFs that provide the same service, support the same network slices, and are identified by the same NF set ID. 3GPP assumes that all of the NFs in an NF set are active, which may not be true, for example, if an operator decides to deploy some NFs in a NF set as active and other NFs in the NF set as standby.

The subject matter described herein provides a method for publishing an NF's HA topology information so that a consumer NF or SCP can use this information when selecting an NF to provide service. The NF HA topology information may define the NF HA type implemented by an NF set, as well as the publishing NF's role in the NF HA type. In absence of this solution, 5G SBI routing is not possible for an HA topology, other than active-active topology. As a workaround, NFs implementing an N+K HA are required to be deployed in an active-active topology where the network operator will face the following challenges:

the NF consumer/SCP would have to incur additional routing attempts in the case of HA an state transition (to standby) after resource creation; and the consumer NF/SCP would have problems in load balancing traffic between NF instances with different HA roles.

More routing attempts would be required if a consumer NF or SCP sends an SBI request to a producer NF operating in a standby role, as an NF operating in a standby role would not be expecting to receive traffic, and such traffic would have to be re-routed by the consumer NF or SCP to another NF operating in an active role. Load balancing would be difficult if the consumer NF or SCP does not know the HA roles of producer NFs, because NFs operating in standby roles should not receive live traffic.

Figure 2:
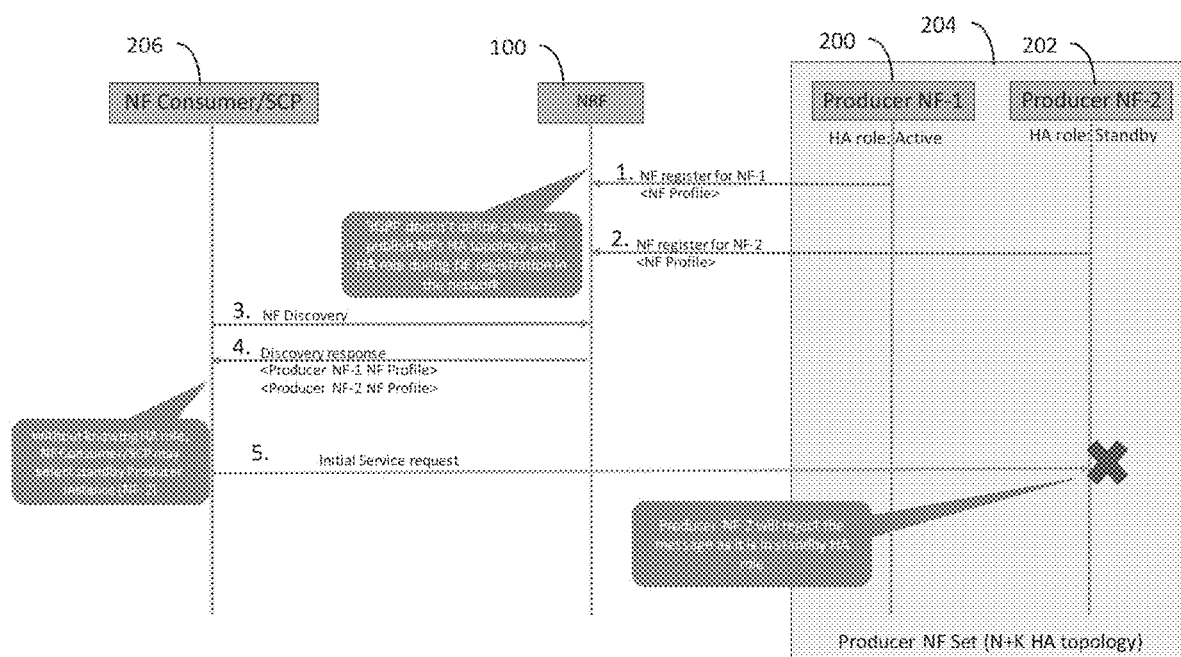
FIG. 2 is a message flow diagram illustrating exemplary messages exchanged between network functions in a network that does not provide support for the distribution of NF HA topology information where a consumer NF selects a producer NF that is currently in a standby HA role.

FIG. 2 is a message flow diagram illustrating exemplary messages exchanged when a consumer NF or SCP attempts to route traffic to a standby producer NF in an NF set that implements an N+K HA topology. In FIG. 2, producer NF-1 200 operates in an active HA role, and producer NF-2 202 operates in a standby HA role. Producer NF-1 200 and producer NF-2 202 form an NF set 204. NF set 204 implements an N+K HA topology.

Referring to the message flow in FIG. 2, in step 1, producer NF-1 200 sends an NFRegister request to NRF 100. The NFRegister request contains the NF profile of producer NF-1 200. However, 3GPP does not define a way for producer NF-1 200 to communicate to NRF 100 the HA topology type implemented by NF set 204 or the role of producer NF-1 200 in the HA topology type.

In step 2 of the message flow diagram, producer NF-2 202 operating in a standby HA role sends an NFRegister request message to NRF 100. The NFRegister request message does not include an indication that producer NF-2 202 is operating in a standby role. As a result, there is no way for consumer NFs to know the NF HA topology type implemented by NF set 204 or the roles of the producer NFs in the NF set.

In step 3 of the message flow diagram, consumer NF or SCP 206 sends an NFDiscover request message to NRF 100. The NFDiscover request message may include discovery parameters for selecting a producer NF to provide service. In step 4 of the message flow diagram, NRF 100 responds to the NFDiscover request message with an NFDiscover response message including the NF profiles of producer NF-1 200 and producer NF-2 202. However, the NFDiscover response message does not include the NF HA type implemented by NF set 204 or the HA roles of producer NF-1 200 and producer NF-2 202. As a result, consumer NF or SCP 206 may route a service based interface (SBI) service request, as indicated by step 5 of the message flow diagram, to a producer NF operating in the standby role. When producer NF-2 202 receives the SBI service request message, because producer NF-2 202 is operating in the standby role, producer NF-2 202 will reject the SBI service request message. As a result, consumer NF or SCP 206 is required to re-route the service request by selecting another NF and sending the SBI service request to another producer NF. Consumer NF or SCP 206 may be required to re-route the service request multiple times until the request is received by a producer NF operating in an active HA role. Such re-routing is time consuming and wastes network resources.

Figure 3:
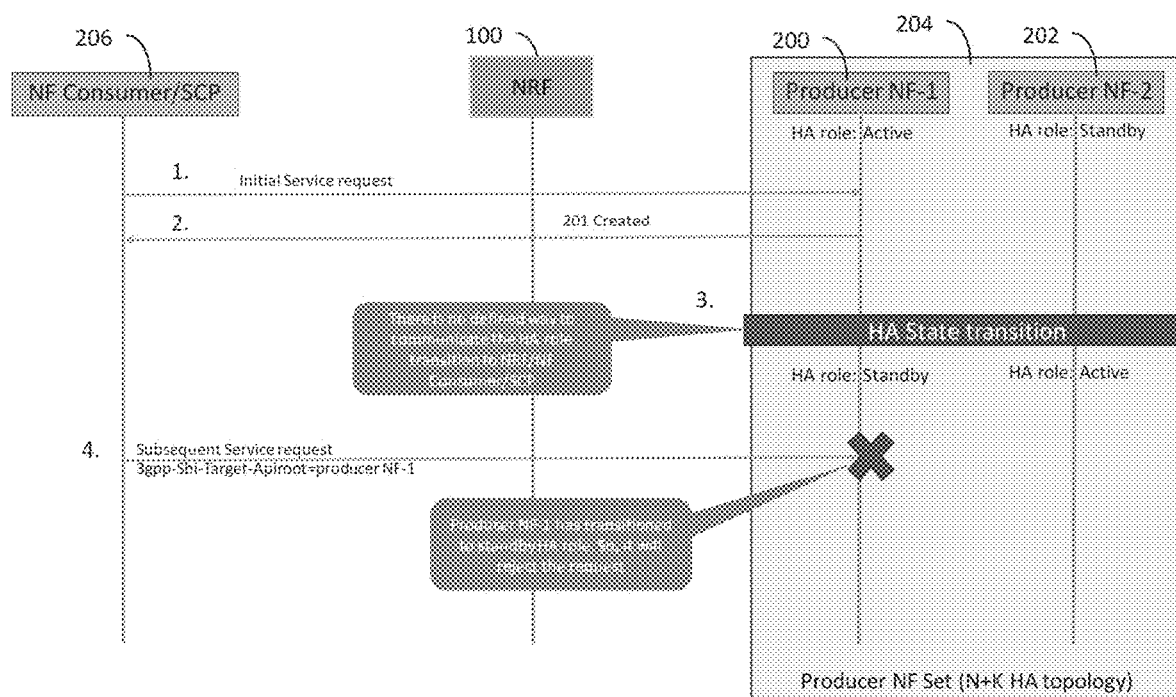
FIG. 3 is a message flow diagram illustrating exemplary messages exchanged between network functions in a network that does not provide support for the distribution of NF HA topology information where a producer NF transitions to a standby HA role and a consumer NF attempts to obtain service from the producer NF after the HA state transition.

FIG. 3 illustrates another problem that can occur when an NF HA state transition occurs. In FIG. 3, it is assumed that producer NF-1 200 and producer NF-2 202 have registered with NRF 100 without specifying their NF HA topology types or the NF HA topology role implemented by the NF set of which producer NF-1 200 or producer NF-2 202 are members. In step 1 of the message flow diagram in FIG. 3, consumer NF or SCP 206 sends ab SBI service request to producer NF-1 200. Because producer NF-1 200 is functioning in the active HA role, producer NF-1 200 responds to the SBI service request in step 2 with a 201 Created message.

In step 3, an HA state transition occurs in NF set 204 where producer NF-1 200 transitions to a standby HA role, and producer NF-2 202 transitions to an active HA role. In step 4 of the message flow diagram, consumer NF or SCP 206 sends a subsequent service request to producer NF-1 200, which is currently operating in the standby HA role. Because producer NF-1 200 is operating in the standby role, producer NF-1 200 rejects the service request. As a result, consumer NF or SCP 206 will be required to re-route the service request to another NF, which results in routing and network inefficiencies.

In order to address the difficulties illustrated by the message flows in FIGS. 2 and 3, subject matter described herein includes the ability of a producer NF to communicate, to the NRF, the NF HA topology type implemented by the NF set of which the producer NF is a member and also the current HA role of the producer NF within the HA topology type. The NRF stores information that indicates the NF HA topology type and current NF HA role in the NF profiles database or in a separate database. When a consumer NF seeks to discover one or more producer NFs to provide a service, the NRF includes in the discovery response, information that indicates the NF HA topology type and NF HA topology role of the producer NFs. The NF service consumer can then use the NF HA topology type and information to select a producer NF to provide service.

Figure 4:
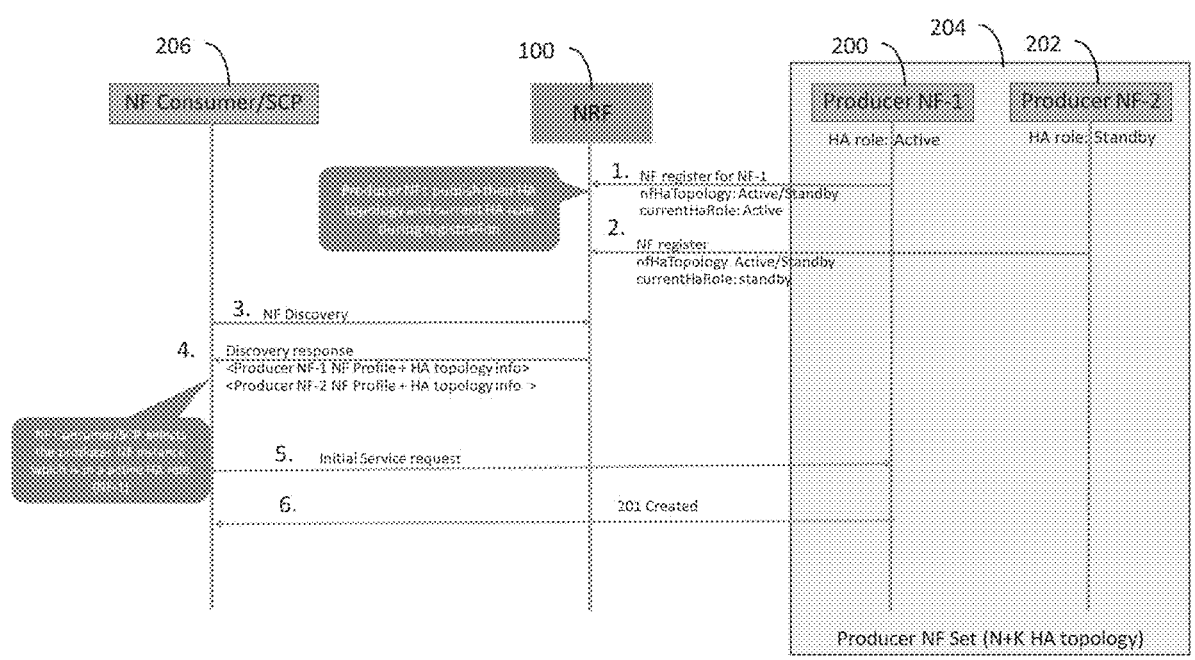
FIG. 4 is a message flow diagram illustrating an exemplary network that supports distribution of NF HA topology information where a producer NF provides the HA topology type implemented by the NF set of which producer NF is a member and the current HA role of the producer NF to an NRF and the NRF provides the HA topology information to a consumer NF in a discovery response so that the consumer NF can use the HA topology information in selecting a producer NF to provide service.

FIG. 4 is a message flow diagram illustrating an exemplary network that supports distribution of NF HA topology information where a producer NF provides the HA topology type implemented by the NF set of which producer NF is a member and the current HA role of the producer NF to an NRF and the NRF provides the HA topology information to a consumer NF in a discovery response so that the consumer NF can use the HA topology information in selecting a producer NF to provide service. Referring to the message flow in FIG. 4, in step 1, producer NF-1 200 sends an NFRegister request message to NRF 100 to register producer NF-1 200 to provide service. The NFRegister request message indicates the NF HA topology type, which in the illustrated example is active/standby and the HF HA role, which, for producer NF-2 202, is active. In step 3 of the message flow diagram, consumer NF or SCP 206 sends an NFDiscover request message to NRF 100. The NFDiscover request message may include discovery parameters for selecting a producer NF to provide service to a consumer NF. In step 4 of the message flow diagram, NRF 100 responds to the NFDiscover request message with an NFDiscover response message including the NF profiles of producer NF-1 200 and producer NF-2 202. The NFDiscover response message includes NF HA topology information that indicates the NF HA type implemented by NF set 204 and the HA roles of producer NF-1 200 and producer NF-2 202. In the illustrated example, the NF HA topology information indicates that the NF HA topology type implemented by NF set 204 is active/standby, the NF HA role currently implemented by producer NF-1 200 is active, and the NF HA role currently implemented by producer NF-2 202 is standby.

Using the NF HA topology information, consumer NF or SCP 206 selects a producer NF that is currently in the active HA role to provide service. In the illustrated example, consumer NF or SCP 206 selects producer NF-1 200 to provide service. In step 5 of the message flow diagram, producer NF or SCP 206 sends an SBI service request to producer NF-1 200, which is operating in the active HA role. Because producer NF-1 200 is operating in the active HA role, producer NF-1 200 accepts the SBI service request, and, in step 6, responds to the SBI service request with a 201 Created message. Thus, FIG. 4 illustrates the case where NF HA topology information is provided to NRF 100 in NFRegister messages, distributed to a consumer NF or SCP in an NFDiscover response message, and used by the consumer NF or SCP to select an active NF to process an initial SBI service request message. Because the consumer NF or SCP has the NF HA topology information, consumer NF or SCP 206 can avoid the routing inefficiency illustrated in FIG. 2.

Figure 5:
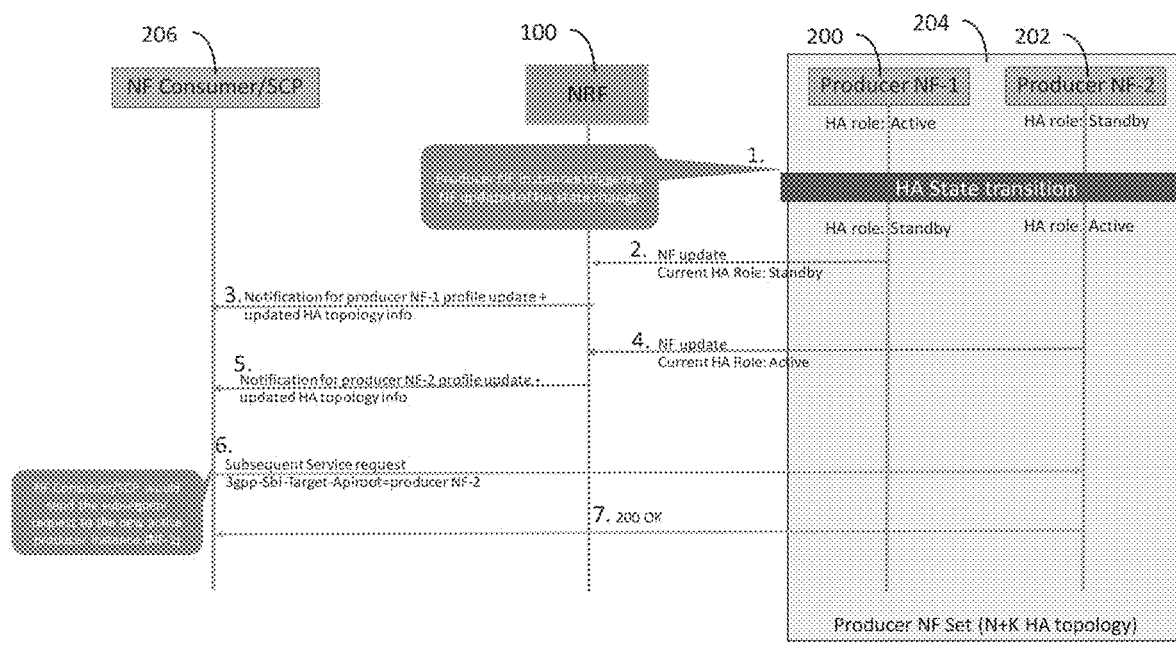
FIG. 5 is a message flow diagram illustrating an exemplary network that supports distribution of HA topology information where a producer NF provides the HA topology type implemented by the NF set of which producer NF is a member and the current HA role of the producer NF to an NRF, the NRF publishes the update in the HA topology information to a consumer NF, and the consumer NF uses the updated HA topology information to select an active producer NF to provide service.

FIG. 5 is a message flow diagram illustrating exemplary messages exchanged to distribute updated NF HA topology information in response to an HA state transition and the use of the update HA topology information to select a new active NF to provide service. Referring to FIG. 5, in step 1, an NF HA state transition occurs. The NF HA state transition is producer NF-1 200 switching its HA role from active to standby and producer NF-2 202 switching its HA role from standby to active. In step 2 of the message flow diagram, producer NF-1 200 sends an NFUpdate request to NRF 100 identifying the new HA role of producer NF-1 200.

In step 3 of the message flow diagram, NRF 100, in response to receiving the NFUpdate request, publishes a notification message to all consumer NFs or SCPs that are subscribed to receive updates regarding changes in status of producer NF-1 200. In the illustrated example, producer NF-1 200 sends the notification message to consumer NF or SCP 206. The notification message includes the updated NF HA topology information for producer NF-1 200.

In step 4 of the message flow diagram, producer NF-2 202 sends NFUpdate request to NRF 100 containing a new NF HA role for producer NF-2 202. In the illustrated example, the NF update message indicates that producer NF-2 202 is switching to the active role. In step 5 of the message flow diagram, NRF 100 sends a notification message to consumer NF or SCP 206 with the updated NF HA topology information for producer NF-2 202.

In step 6 of the message flow diagram, consumer NF or SCP 206 formulates a subsequent SBI service request message, and, rather than sending the subsequent SBI service request message to producer NF-1 200, consumer NF or SCP 206 sends the subsequent SBI service request to producer NF-2 202 based on the current updated HF HA topology information. In the example illustrated in FIG. 5, it is assumed that when producer NF-2 202 switches to the active state, producer NF-2 202 has obtained the necessary state information to process the subsequent SBI service request from consumer NF or SCP 206. In step 7 of the message flow diagram producer NF-2 202 sends a 200 OK message to consumer NF or SCP 206.

Thus, FIG. 5 illustrates the case where producer NFs automatically update their HA roles and communicate their new HA roles to NRF 100 and where NRF 100 automatically distributes indications of the change in status to consumer NFs and SCPs that are subscribed to receive updates regarding change in status of an NF. Using the updated NF HA topology information, the subject matter described herein avoids the scenario illustrated in FIG. 3 where an NF HA state transition occurs and a subsequent SBI service request lands on a standby producer NF. Thus, the scenario illustrated in FIG. 5 provides increased efficiency over the scenario illustrated in FIG. 3 where the consumer NF or SCP is required to re-route the service request to another producer NF.

Figure 6:
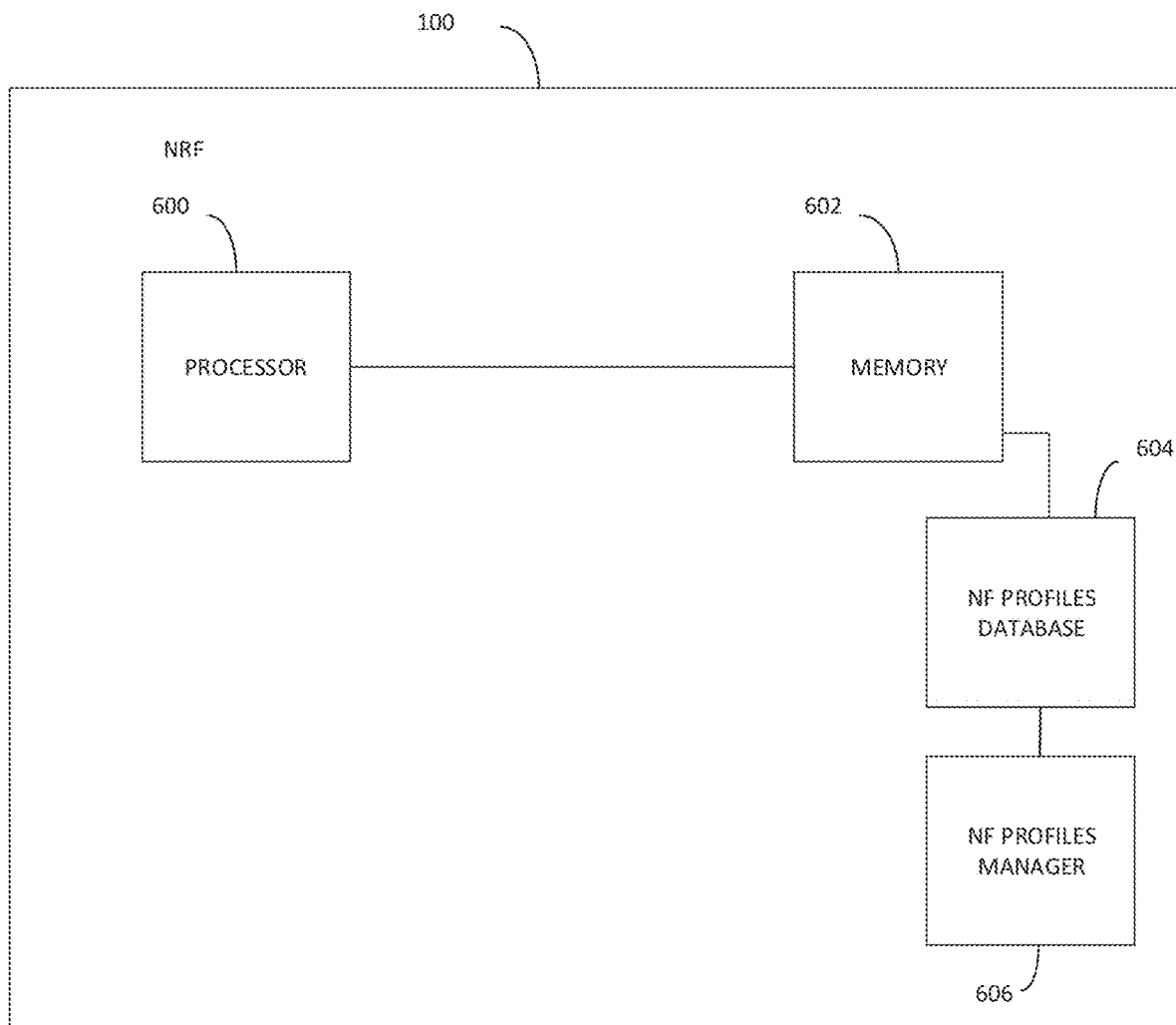
FIG. 6 is a block diagram illustrating an exemplary architecture for an NRF that facilitates distribution of NF HA topology information to consumer NFs and SCPs.

FIG. 6 is a block diagram illustrating an exemplary architecture of NRF 100 capable of obtaining, storing, and distributing producer NF HA topology information. Referring to FIG. 6, NRF 100 includes at least one processor 600 and a memory 602. NRF 100 further includes an NF profiles database 604 that stores NF profiles of producer NFs that are registered with NRF 100. NRF 100 further includes an NF profiles manager 606 that receives NFRegister request messages, stores NF profiles of producer NFs in database 604, and distributes NF profile information from consumer NFs. NF profiles manager 606 may also receive NF HA topology information from producer NFs and store the HF HA topology information in NF profiles database 604 or in a separate database maintained by NRF 100. NF profiles manager 606 may provide the NF HA topology information to consumer NFs or SCPs in response to NFDiscover requests and also in response to NFUpdate messages from producer NFs. NF profiles manager 606 may be implemented using computer executable instructions stored in memory 602 and executed by processor 600.

Figure 7:
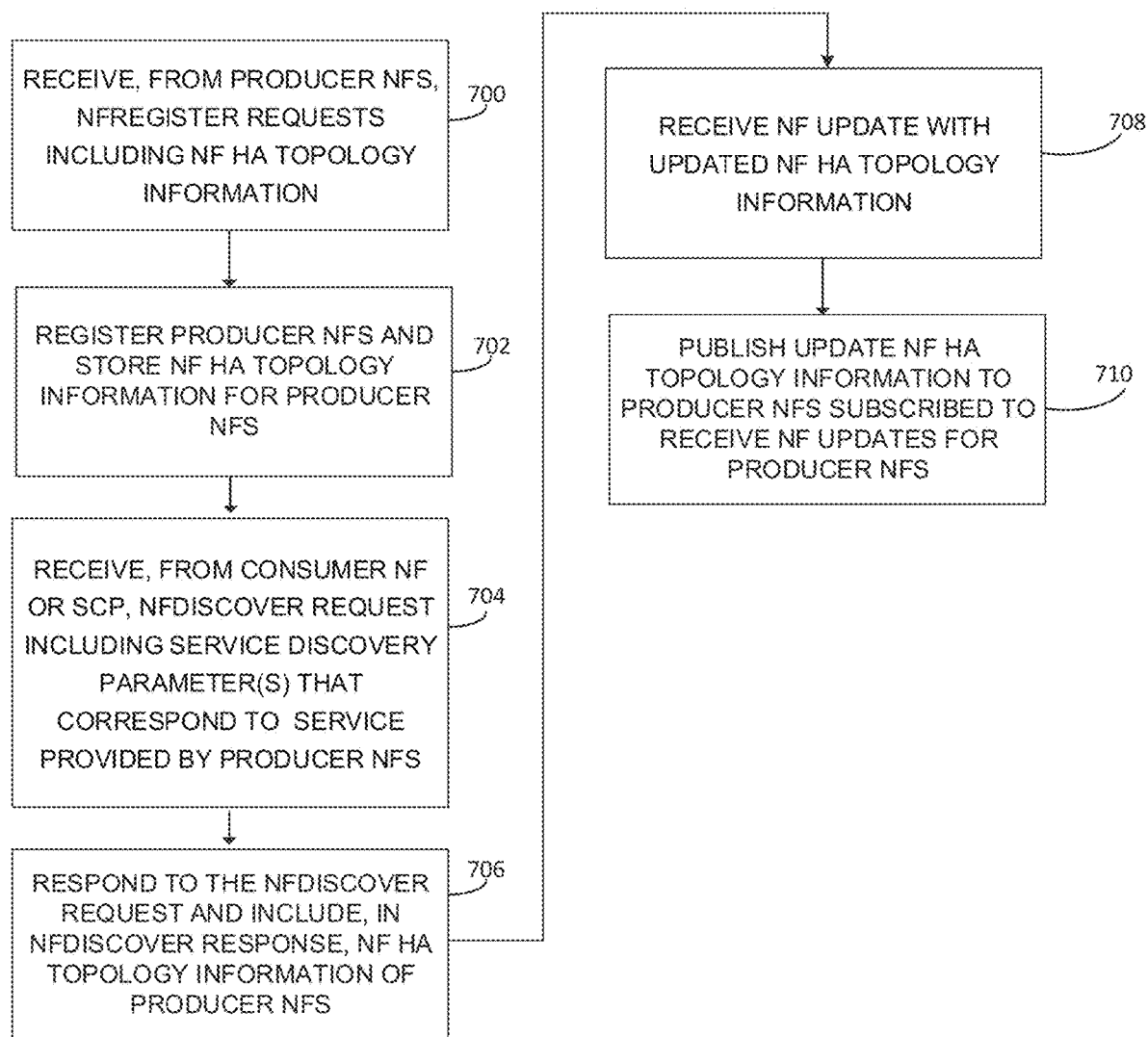
FIG. 7 is a flow chart illustrating an exemplary process performed by an NRF for distributing NF HA topology information to NFs and SCPs.

FIG. 7 is a flow chart illustrating an exemplary method for distributing NF HA information. The steps in FIG. 7 are performed at an NRF, such as NRF 100. Referring to FIG. 7, in step 700, the process includes receiving, from a plurality of producer NFs in an NF set, NFRegister requests including NF HA topology information for the producer NFs. For example, NRF 100 may receive NFRegister requests from producer NFs, where the NFRegister requests include information identifying an NF HA topology type implemented by the producer NFs and a current NF HA topology role implemented by each producer NF in the NF set. As described above, NF HA topology types may include active-active, active-standby, and N+K, where N and K are integers that respectively identify the number of active and standby NFs in an NF set. The NF HA topology role information provided in the NFRegister requests may identify each NF as active or standby.

In step 702, the process includes registering the producer NFs and storing the NF HA topology information for the producer NFs. For example, NRF 100 may register the producer NFs by storing the NF profiles for the producer NFs in NF profiles database 604 and storing registration status or state indicators for the NFs indicating a status or state of REGISTERED. NRF 100 may store the NF HA topology information in NF profiles database 604 or in a separate database used to store NF HA topology information.

In step 704, the process includes receiving, from a consumer NF or service communication proxy (SCP), an NFDiscover request containing at least one service discovery parameter that corresponds to a service provided by the producer NFs. For example, NRF 100 may receive an NFDiscover request from a consumer NF that includes parameters identifying a type of service for which NF discovery is being requested.

In step 706, the process includes responding to the NFDiscover request by generating an NFDiscover response, including, in the NFDiscover response, the NF HA topology information for the producer NFs, and transmitting the NFDiscover response to the consumer NF or SCP. For example, NRF 100 may generate an NFDiscover response message in response to a received NFDiscover request message. The NFDiscover response message may include NF profiles of producer NFs that match the service identifying parameters in the NFDiscover request. The NFDiscover response may also include, for each NF for which NF HA topology information is available, the NF HA type implemented by the producer NF set and the current NF HA role of each producer NF. It should be noted that the NF HA topology information may be included as one or more attributes of the NF profile of each producer NF or may be communicated separately from the NF profiles of the producer NFs.

In step 708, the process includes receiving updated NF HA topology information for a producer NF. For example, NRF 100 may receive an NFUpdate request message from a producer NF when the NF HA topology role of the producer NF changes. Examples of NF HA topology role changes include changes from active to standby or from standby to active.

In step 710, the process includes publishing the updated NF HA topology information for the producer NF to NFs subscribed to receive NFUpdates regarding the producer NF. For example, NRF 100, in response to receiving an NFUpdate request message regarding a producer NF may update the profile for the producer NF in the NF profiles database. In addition, NRF 100 may also update the NF HA role for the producer NF if the NF HA role for the producer NF changed. NRF 100 may then communicate notification of changes in the NF profile and the NF HA topology information to consumer NFs and SCPs that are subscribed to receive the updates.

Figure 8:
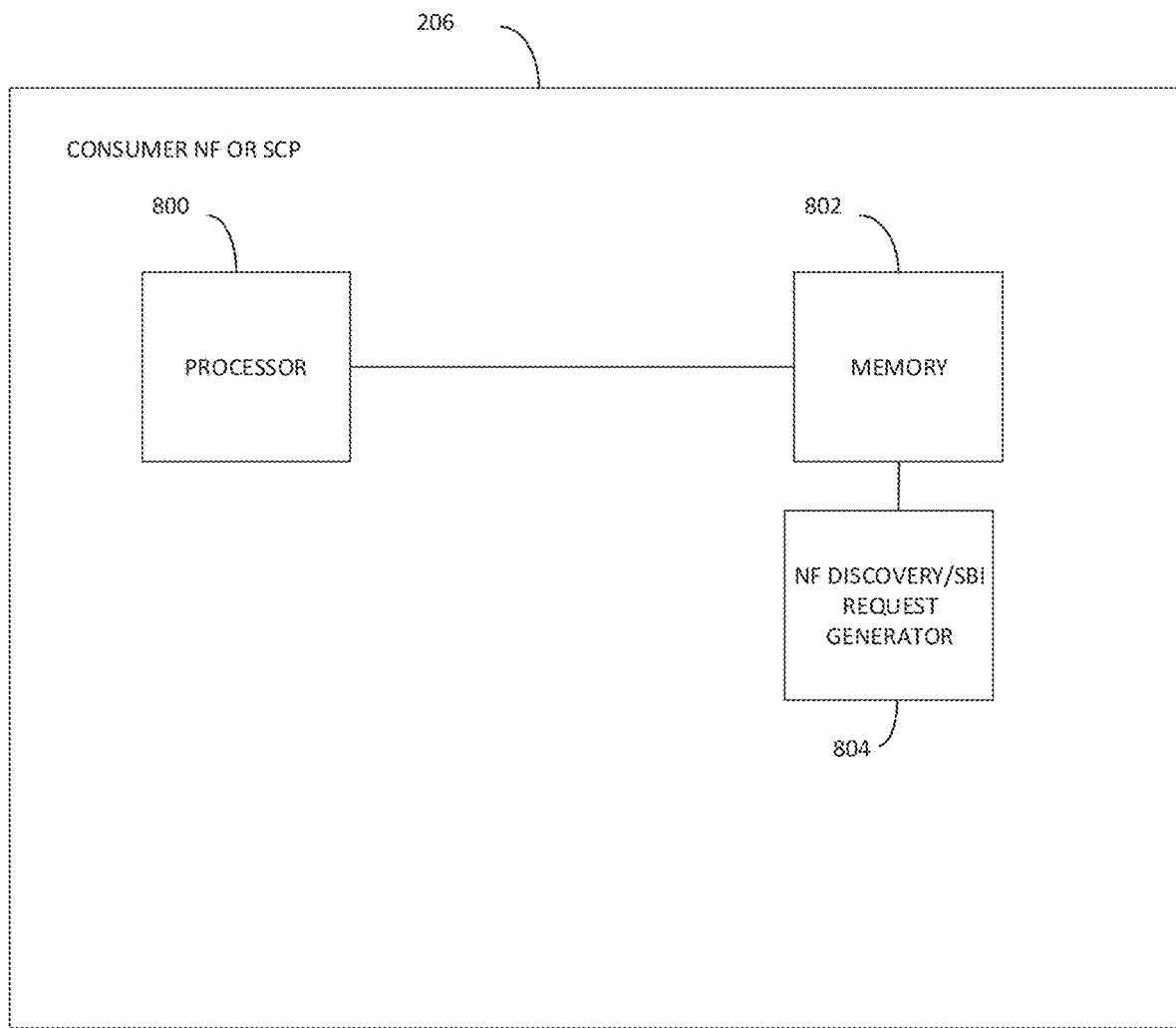
FIG. 8 is a block diagram illustrating an exemplary architecture for a consumer NF for obtaining and using NF HA topology information.

FIG. 8 is a block diagram illustrating an exemplary architecture for consumer NF or SCP 206 that obtains and uses NF HA topology information to route SBI service requests. Referring to FIG. 8, consumer NF or SCP 206 includes at least one processor 800 and a memory 802. Consumer NF or SCP 206 further includes and NF discovery/SBI request generator 804 that generates and sends NFDiscover requests to NRF 100, receives NFDiscover responses from NRF 100, where the NFDiscover responses include NF HA topology information, and generates and sends SBI requests to producer NFs selected using the NF HA topology information. NF discovery/SBI request generator 804 may be implemented using computer executable instructions stored in memory 802 and executed by processor 800.

Figure 9:
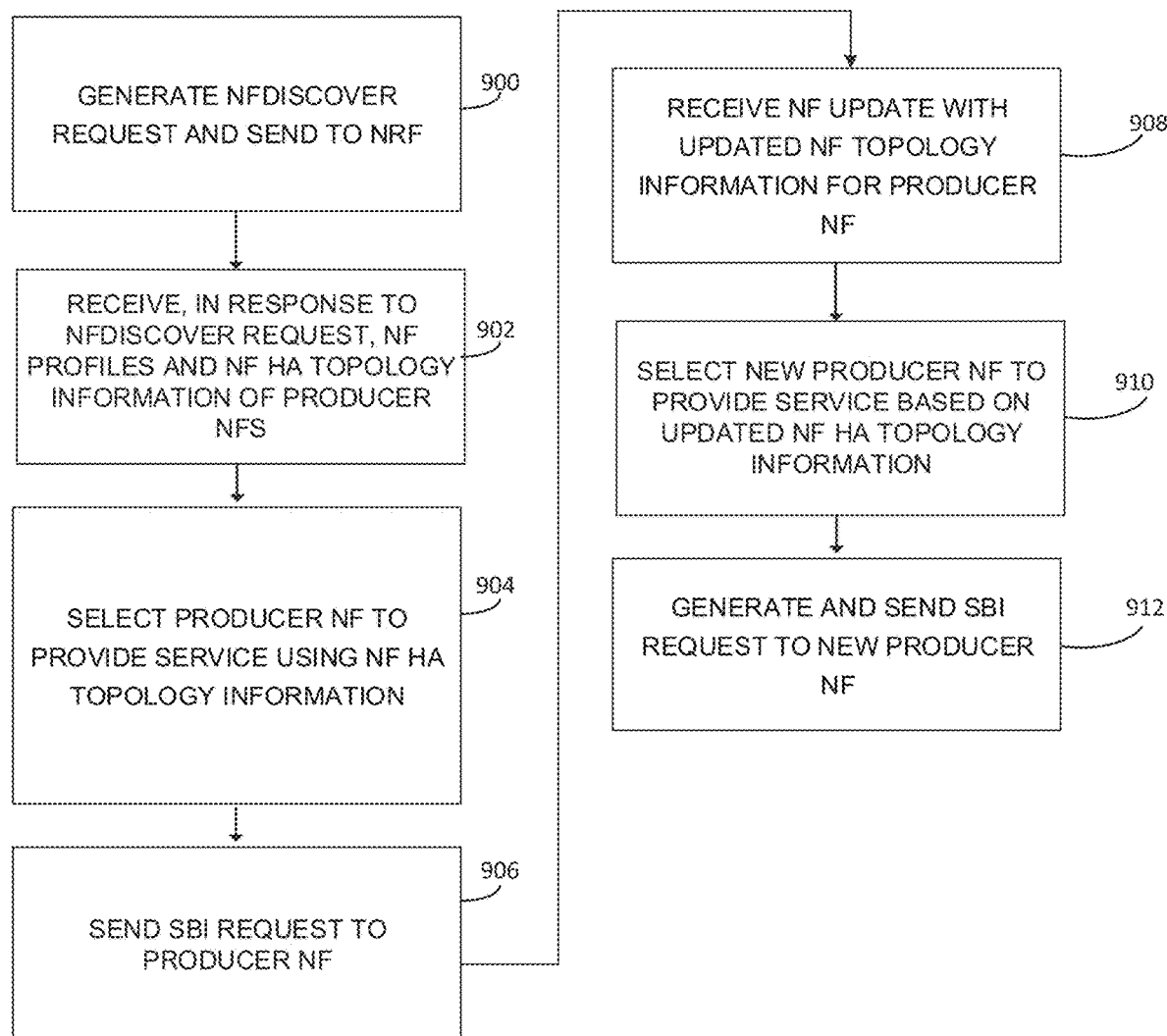
FIG. 9 is a flow chart illustrating an exemplary process performed by a consumer NF for obtaining and using NF HA topology information.

FIG. 9 is a flow chart illustrating an exemplary process implemented by a consumer NF or SCP for obtaining and using NF HA topology information to select a producer NF to provide service. The steps illustrated in FIG. 9 may be implemented by consumer NF or SCP 206 illustrated in FIG. 8. Referring to FIG. 9, in step 900, the process includes generating an NFDiscover request and sending the NFDiscover request to an NRF. For example, consumer NF or SCP 206 may generate an NFDiscover request including discovery parameters for a service needed by a consumer NF and send the NFDiscover request to NRF 100.

In step 902, the process includes, in response to the NFDiscover request, receiving an NFDiscover response. The NFDiscover response includes NF profiles matching the discovery parameters from the request as well as NF HA topology information of producer NFs. The NF HA topology information may be included in the NF profiles or may be included in data structures separate from the NF profiles.

In step 904, the process includes selecting a producer NF to provide a service using the NF HA topology information. For example, consumer NF for SCP 206 may use the NF HA topology information to select an active NF to provide service for the consumer NF. In step 906, the process includes sending a new SBI request to the producer NF. For example, consumer NF or SCP 206 may send an SBI request to the producer NF that was selected using the NF HA topology information.

In step 908, the process includes receiving an NFUpdate request message with updated NF HA topology information for the producer NF. For example, consumer NF for SCP 206 may receive an NFUpdate request message containing updated HF HA topology information for a producer NF currently providing service for the consumer NF. The updated NF HA topology information may indicate that the role of the producer NF has changed.

In step 910, the process includes selecting a new producer NF to provide the service based on the updated HF HA topology information. For example, consumer NF or SCP 206 may select a new active producer NF to provide service when the role of the producer NF currently providing service changes to standby. In step 912, consumer NF or SCP 206 generates and sends a new SBI request to the new producer NF. For example, consumer NF or SCP 206 may generate and send an SBI request to a producer NF that is currently active.

Figure 10:
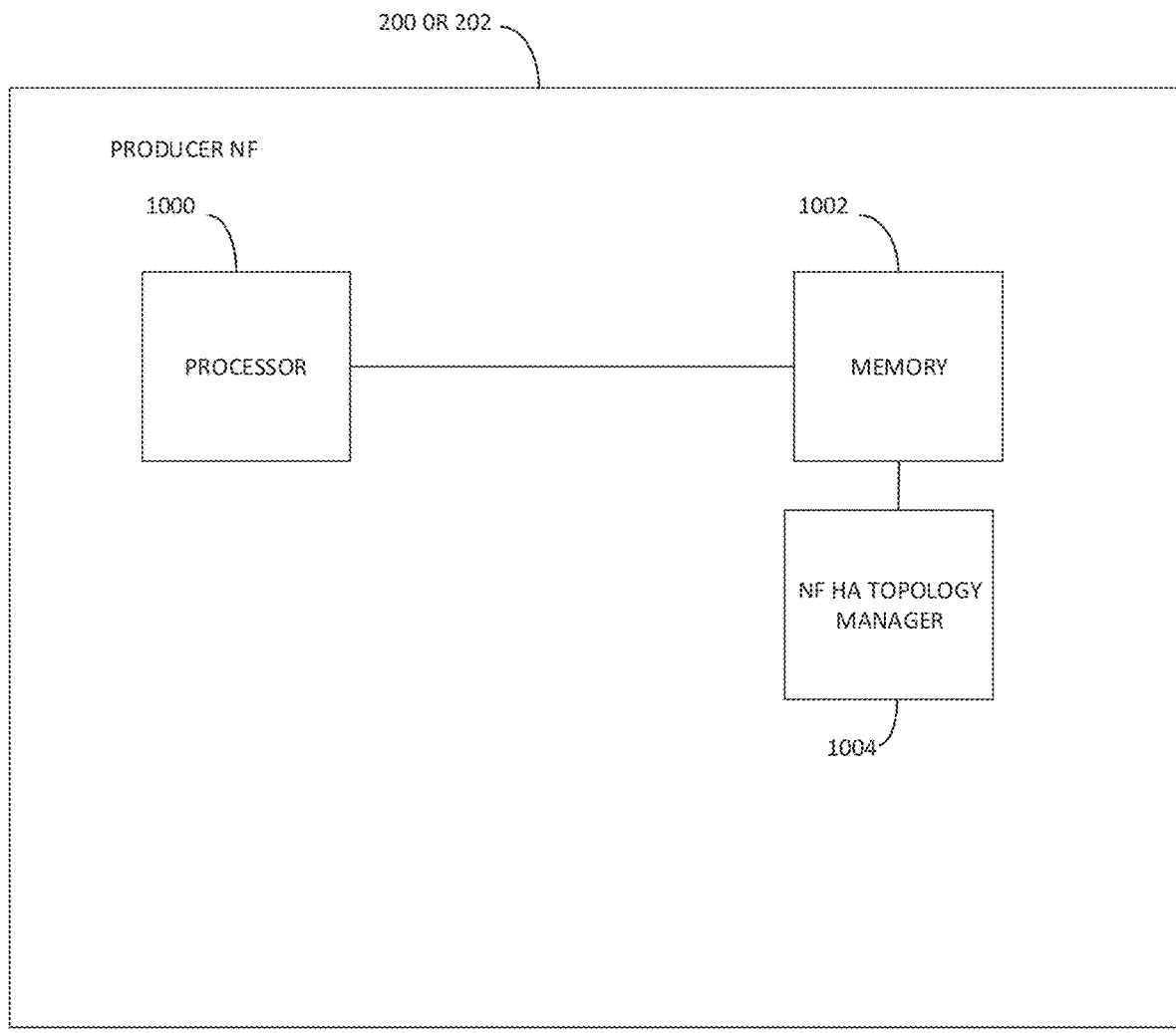
FIG. 10 is a block diagram illustrating an exemplary architecture for a producer NF for distributing NF HA topology information.

FIG. 10 is a block diagram illustrating an exemplary producer NF 200 or 202 capable of distributing NF HA topology information to other NFs. Referring to FIG. 10, producer NF 200 or 202 includes at least one processor 1000 and a memory 1002. Producer NF 200 or 202 further includes an NF HA topology manager 1004 that maintains, in memory 1002, indications of the NF HA topology type and NF HA topology role implemented by producer NF 200 or 202. NF HA topology manager 1004 may also determine when the NF HA topology role of producer NF 200 or 202 needs to change, e.g., based on input from a network operator that the NF HA topology of producer NF 200 or 202 needs to change. Producer NF 200 or 202 also distributes its NF HA topology information to other NFs by sending NFRegister and NFUpdate messages to NRF 100. NF HA topology manager 1004 may be implemented using computer executable instructions stored in memory 1002 and executed by processor 1000.

Figure 11:
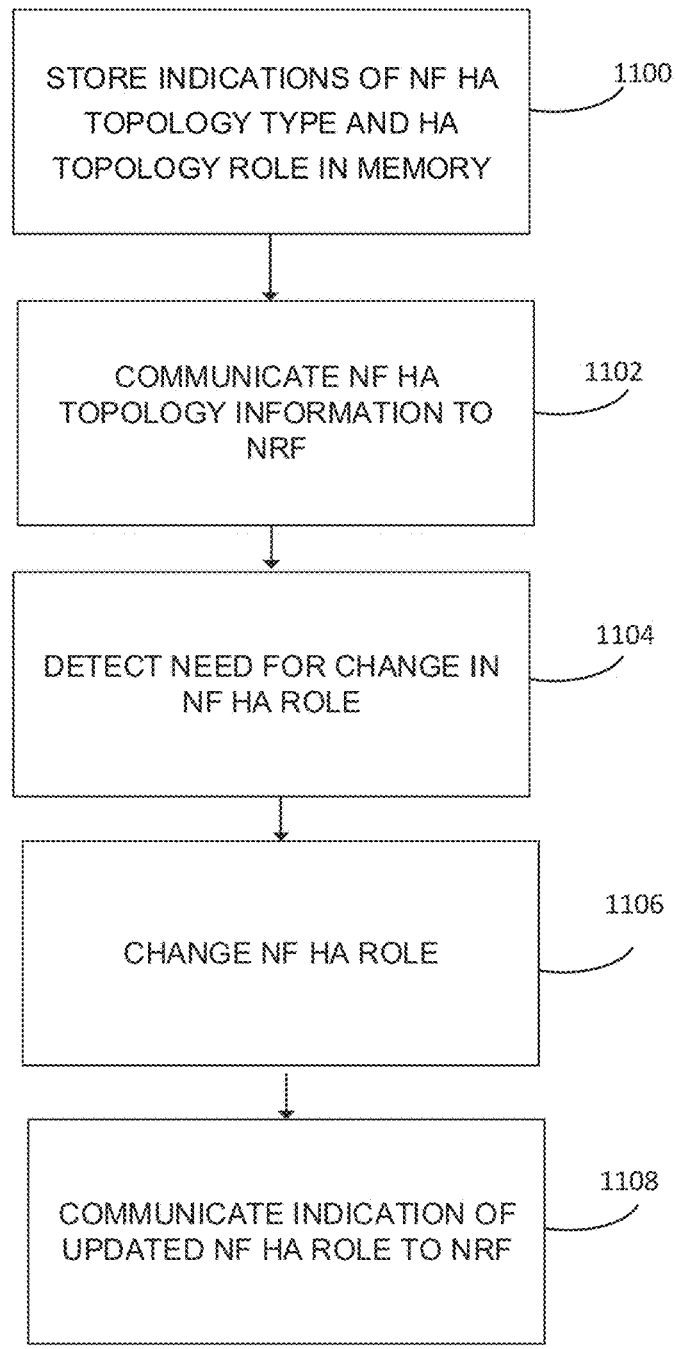
FIG. 11 is a flow chart illustrating an exemplary process performed by a producer NF for distributing NF HA topology information.
Figure 2:
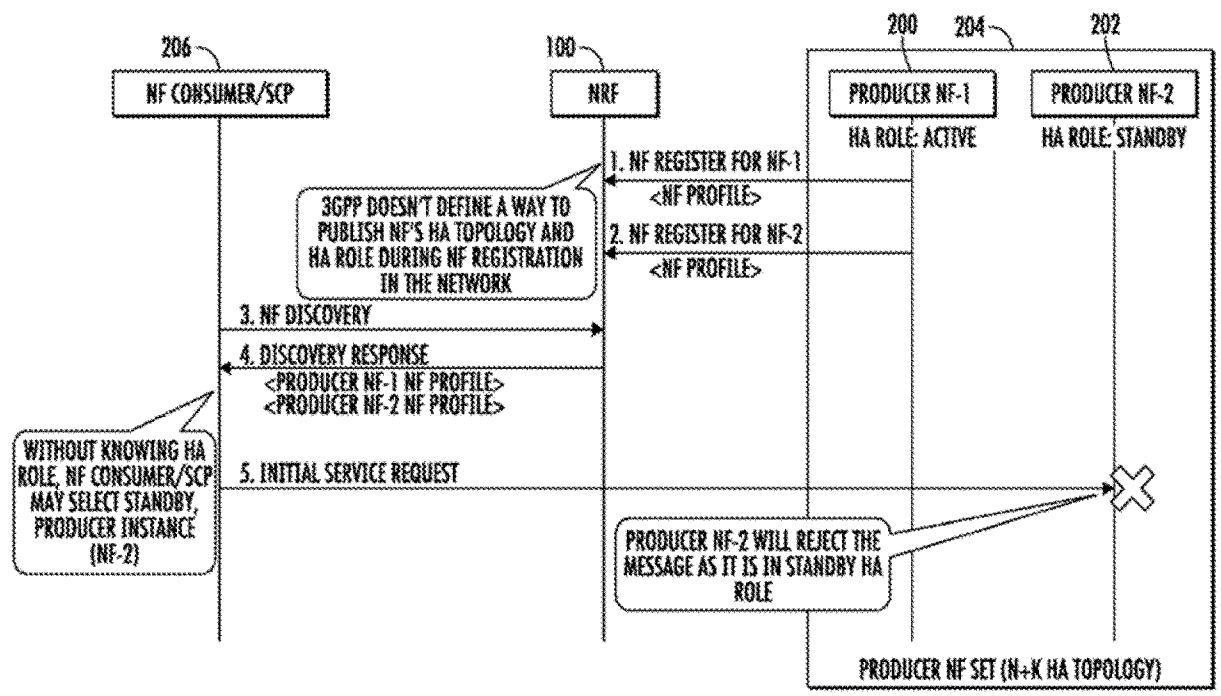
Figure 3:
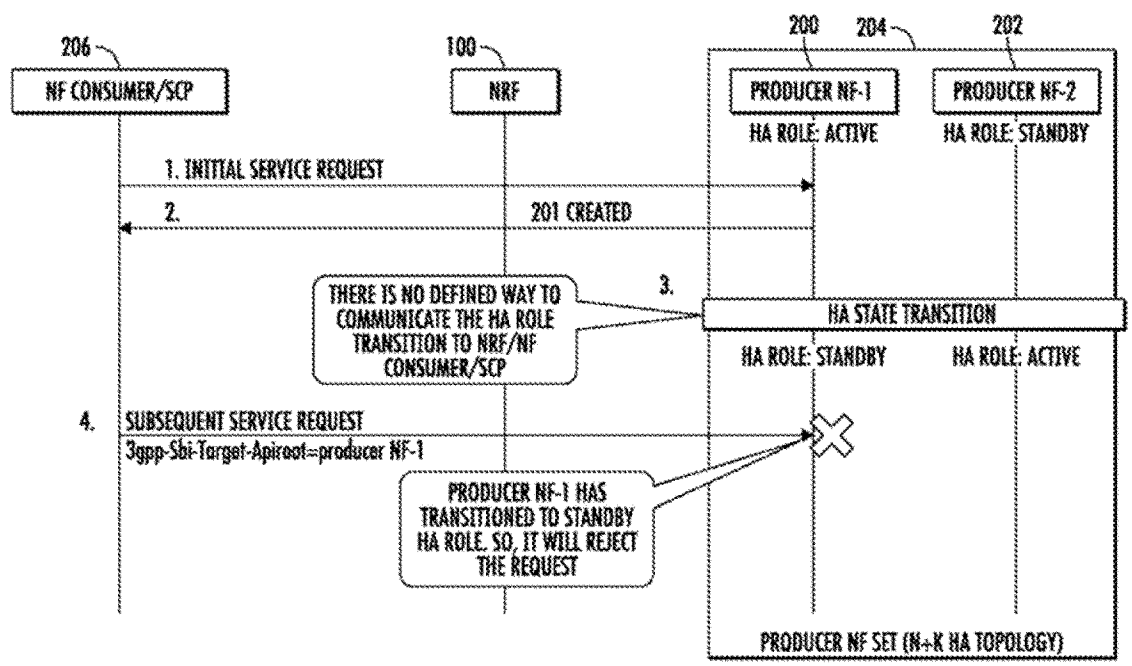
Figure 4:
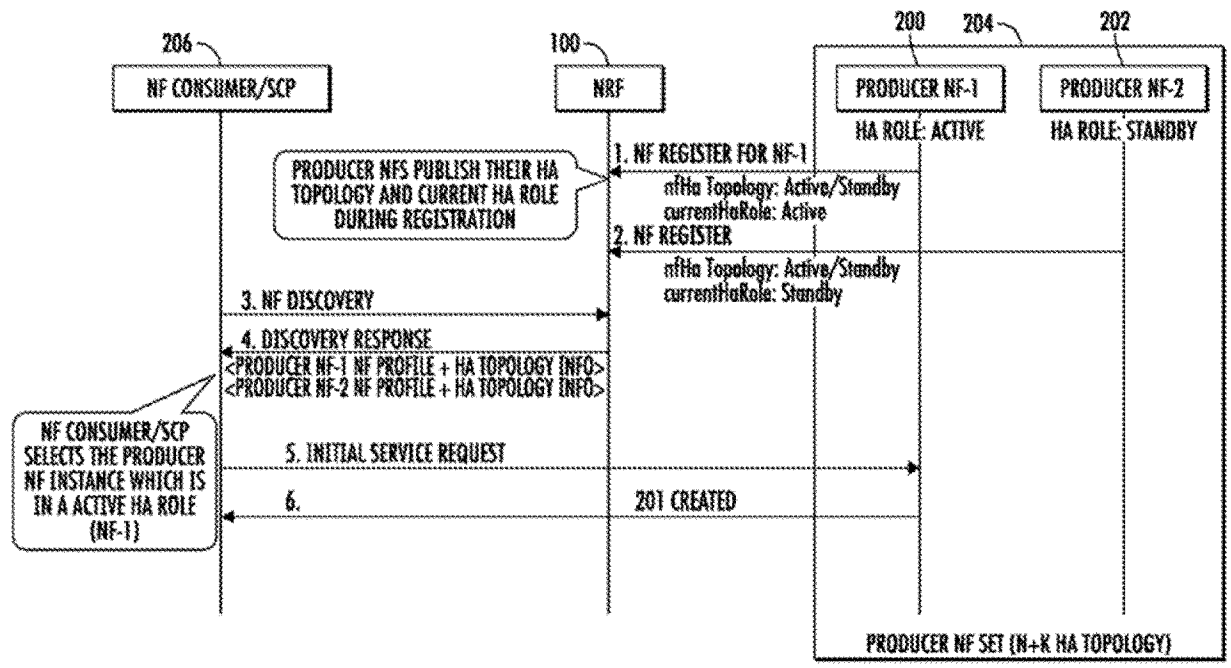
Figure 5:
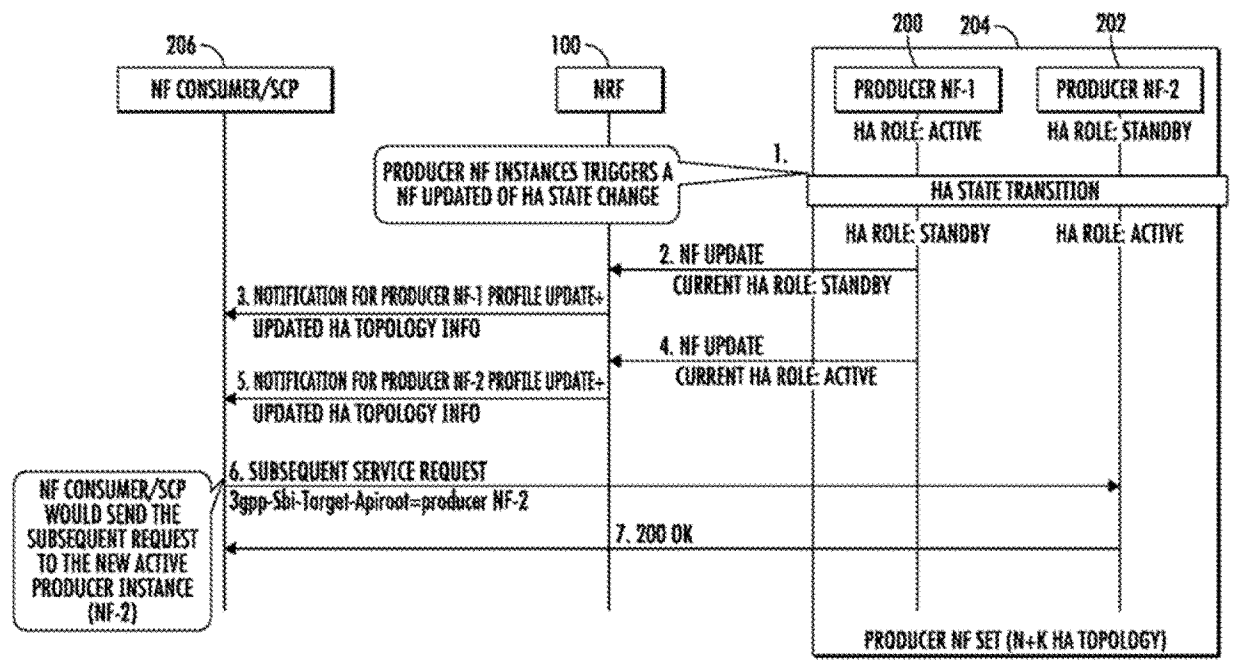

FIG. 11 illustrates an exemplary process implemented by a producer NF in distributing its NF HA topology information to other NFs. Referring to FIG. 11, in step 1100, the process includes storing indications of HA topology type and HA topology role in memory. For example, producer NF 200 or 202 may store, in memory 1002, an indication of the current HA topology type and HA topology role implemented by producer NF 200 or 202.

In step 1102, the process includes communicating the NF HA topology information to the NRF. For example, producer NF 200 or 202 may generate and send an NFRegister request including the NF HA topology information to NRF 100.

In step 1104, the process includes detecting a need for a change in NF HA role. For example, producer NF 200 or 202 may determine that its NF HA topology role needs to change in response to receiving notification of the need for a change from a network operator.

In step 1106, producer NF 200 or 202 changes its NF HA role. For example, producer NF 200 or 202 may change from active to standby or from standby to active. In step 1108, producer NF 200 or 202 communicates an indication of the updated NF HA role to the NRF. For example, producer NF 200 or 202 may generate and send an NFUpdate request message with the updated NF HA role to NRF 100.

Benefits of the subject matter described herein include synergy between the NRF and SCP in indirect communication models. Another benefit is that the subject matter enables NFs to expose their supported HA topology in the 5GC, which results in better (re-)routing and load balancing handling at the NF consumer/SCP. The subject matter described herein also provides better routing resiliency for producers supporting an active-standby or an N+K HA topology. The subject matter described herein also provides better routing resiliency for networks with hybrid NF deployments (virtual machine (VM), hardware, cloud-native) with different HA topologies.

The disclosure of each of the following references is hereby incorporated herein by reference in its entirety.

REFERENCES 1. 3rd Generation Partnership Project; Technical Specification Group Services and System Aspects; System architecture for the 5G System (5GS); Stage 2 (Release 17) 3GPP TS 23.501 V17.0.0 (2021-03).
2. 3rd Generation Partnership Project; Technical Specification Group Core Network and Terminals; 5G System; Network Function Repository Services; Stage 3 (Release 17) 3GPP TS 29.510 V17.1.0 (2021-03).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for distributing network function (NF) high availability (HA) topology information in a core network, the method comprising:
   at a network function (NF) repository function (NRF) including at least one processor:
   receiving, from a plurality of producer NFs in an NF set, NFRegister request messages including NF HA topology information for the producer NFs, wherein the NF HA topology information includes, for each of the producer NFs in the NF set, information identifying a current NF HA topology role of the producer NF, wherein the information identifying the current NF HA topology role of the producer NF identifies the producer NF as an active producer NF or a standby producer NF;
   registering the producer NFs and storing the NF HA topology information for the producer NFs;
   receiving, from a consumer NF or service communication proxy (SCP), an NFDiscover request message containing at least one service discovery parameter that corresponds to a service provided by the producer NFs; and
   responding to the NFDiscover request message by generating an NFDiscover response message, including, in the NFDiscover response message, the NF HA topology information for the producer NFs, and transmitting the NFDiscover response message to the consumer NF or SCP; and
   at the consumer NF or SCP, receiving the NFDiscover response message and using the information identifying each of the producer NFs as an active producer NF or a standby producer NF to select one of the producer NFs in the NF set identified as an active producer NF and avoid selection of producer NFs in the NF set that are standby producer NFs.

2. The method of claim 1 wherein receiving the NFRegister request messages including the NF HA topology information includes receiving the NFRegister request messages including information identifying an NF HA topology type supported by the producer NFs.

3. The method of claim 2 wherein the information identifying the NF HA topology type includes information identifying one of: an active-active NF HA topology type, an active-standby NF HA topology type, and an N+K NF HA topology type, where N and K are integers respectively identifying a number of active NFs and a number of standby NFs in the NF set.

4. The method of claim 3 wherein responding to the NFDiscover request message with the NFDiscover response message including the NF HA topology information comprises including, in the NFDiscover response message, the information identifying the NF HA topology type.

5. The method of claim 1 comprising, at the NRF, receiving, from at least one of the producer NFs, an NFUpdate request message including updated NF HA topology information for the at least one producer NF and, in response to the receiving the NFUpdate request message with the updated NF HA topology information for the at least one producer NF, storing the updated NF HA topology information for the at least one producer NF and automatically communicating the updated NF HA topology information to consumer NFs subscribed to receive updates in NF profile information for the at least one producer NF.

6. The method of claim 5 wherein the updated NF HA topology information indicates a change in role of a first producer NF in the NF set from an active HA role to a standby HA role and of a second producer NF in the NF set from a standby HA role to an active HA role and wherein the method further comprises, at the consumer NF or SCP, transmitting a service request to the second producer NF.

7. The method of claim 1 wherein receiving the NFDiscover request message from a consumer NF or SCP includes receiving the NFDiscover request message from a consumer NF.

8. The method of claim 1 wherein receiving the NFDiscover request message from a consumer NF or SCP includes receiving the NFDiscover request message from an SCP.

9. A system for distributing network function (NF) high availability (HA) topology information in a core network, the system comprising:
   a network function (NF) repository function (NRF) including at least one processor;
   an NF profiles manager implemented by the at least one processor for receiving, from a plurality of producer NFs in an NF set, NFRegister request messages including NF HA topology information for the producer NFs, wherein the NF HA topology information includes, for each of the producer NFs in the NF set, information identifying a current NF HA topology role of the producer NF, wherein the information identifying the current NF HA topology role of the producer NF identifies the producer NF as an active producer NF or a standby producer NF, receiving an NFDiscover request containing at least one service discovery parameter that corresponds to a service provided by the producer NFs, and responding to the NFDiscover request by generating an NFDiscover response, including, in the NFDiscover response, the NF HA topology information for the producer NFs, and transmitting the NFDiscover response; and
   a consumer NF or service communication proxy (SCP) for receiving the NFDiscover response message and using the information identifying each of the producer NFs as an active producer NF or a standby producer NF to select one of the producer NFs in the NF set identified as an active producer NF and avoid selection of producer NFs in the NF set that are standby producer NFs.

10. The system of claim 9 wherein the NFRegister request messages include information identifying an NF HA topology type supported by the producer NFs.

11. The system of claim 10 wherein the information identifying the NF HA topology type includes information identifying one of: an active-active NF HA topology type, an active-standby NF HA topology type, and an N+K NF HA topology type, where N and K are integers respectively identifying a number of active NFs and a number of standby NFs in the NF set.

12. The system of claim 11 wherein the NFDiscover response includes the information identifying the NF HA topology type.

13. The system of claim 9 wherein the NF profiles manager is configured to receive, from at least one of the producer NFs, an NFUpdate request message including updated NF HA topology information for the at least one producer NF and, in response to the receiving the NFUpdate request message with the updated NF HA topology information for the at least one producer NF, store the updated NF HA topology information for the at least one producer NF and automatically communicate the updated NF HA topology information to consumer NFs subscribed to receive updates in NF profile information for the at least one producer NF.

14. The system of claim 13 wherein the updated NF HA topology information indicates a change in role of a first producer NF in the NF set from an active HA role to a standby HA role and of a second producer NF in the NF set from a standby HA role to an active HA role.

15. The system of claim 9 wherein the NF profiles manager receives the NFDiscover request message from a consumer NF.

16. The system of claim 9 wherein the NF profiles manager receives the NFDiscover request message from an SCP.

17. A non-transitory computer readable medium having stored thereon executable instructions that when executed by a processor of a computer control the computer to perform steps comprising:
   at a network function (NF) repository function (NRF):
      receiving, from a plurality of producer NFs in an NF set, NFRegister request messages including NF high availability (HA) topology information for the producer NFs, wherein the NF HA topology information includes, for each of the producer NFs in the NF set, information identifying a current NF HA topology role of the producer NF, wherein the information identifying the current NF HA topology role of the producer NF identifies the producer NF as an active producer NF or a standby producer NF;
      registering the producer NFs and storing the NF HA topology information for the producer NFs;
      receiving, from a consumer NF or service communication proxy (SCP), an NFDiscover request message containing at least one service discovery parameter that corresponds to a service provided by the producer NFs; and
      responding to the NFDiscover request message by generating an NFDiscover response message, including, in the NFDiscover response message, the NF HA topology information for the producer NFs, and transmitting the NFDiscover response message to the consumer NF or SCP; and
   at the consumer NF or SCP, receiving the NFDiscover response message and using the information identifying each of the producer NFs as an active producer NF or a standby producer NF to select one of the producer NFs in the NF set identified as an active producer NF and avoid selection of producer NFs in the NF set that are standby producer NFs.

* * * * *

UNITED STATES PATENT AND TRADEMARK OFFICE
CERTIFICATE OF CORRECTION

| | |
|---|---|
| PATENT NO. | : 11,611,626 B1 |
| APPLICATION NO. | : 17/334268 |
| DATED | : March 21, 2023 |
| INVENTOR(S) | : Srivastava et al. |

It is certified that error appears in the above-identified patent and that said Letters Patent is hereby corrected as shown below:

In the Drawings

Sheet 2 of 11, replace Figure 2 with the attached replacement drawing sheet.

Sheet 3 of 11, replace Figure 3 with the attached replacement drawing sheet.

Sheet 4 of 11, replace Figure 4 with the attached replacement drawing sheet.

Sheet 5 of 11, replace Figure 5 with the attached replacement drawing sheet.

Signed and Sealed this
Twenty-ninth Day of July, 2025

Coke Morgan Stewart
*Acting Director of the United States Patent and Trademark Office*